(12) United States Patent
Wishin et al.

(10) Patent No.: US 10,858,005 B2
(45) Date of Patent: Dec. 8, 2020

(54) LAUNCH CONTROL

(71) Applicant: Honda Motor Co., Ltd., Tokyo (JP)

(72) Inventors: David J. Wishin, Marysville, OH (US); Michael T. Dickinson, Marysville, OH (US); Yasuhiro Nozaki, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 16/218,959

(22) Filed: Dec. 13, 2018

(65) Prior Publication Data

US 2020/0189593 A1   Jun. 18, 2020

(51) Int. Cl.
| | | |
|---|---|---|
| *B60W 30/18* | (2012.01) |
| *B60W 10/02* | (2006.01) |
| *B60W 10/06* | (2006.01) |
| *B60W 10/11* | (2012.01) |
| *B60W 50/08* | (2020.01) |

(52) U.S. Cl.
CPC ...... *B60W 30/18027* (2013.01); *B60W 10/02* (2013.01); *B60W 10/06* (2013.01); *B60W 10/11* (2013.01); *B60W 50/082* (2013.01); B60W 2510/0638 (2013.01); B60W 2520/10 (2013.01); B60W 2540/10 (2013.01); B60W 2540/12 (2013.01); B60W 2710/1044 (2013.01)

(58) Field of Classification Search
None
See application file for complete search history.

(56) References Cited

U.S. PATENT DOCUMENTS

| | | |
|---|---|---|
| 5,980,428 A | 11/1999 | Liu |
| 6,041,276 A | 3/2000 | John et al. |
| 7,801,657 B2 | 9/2010 | Piyabongkam et al. |
| 8,038,573 B2 | 10/2011 | Kozub et al. |
| 8,175,785 B2 | 5/2012 | Turski et al. |
| 8,202,199 B2 | 6/2012 | Katakura et al. |
| 8,996,266 B2 | 3/2015 | Hultengren et al. |
| 9,283,957 B2 | 3/2016 | Moon et al. |
| 9,347,387 B2 | 5/2016 | Heintze |
| 9,592,831 B2 | 3/2017 | Blakeway et al. |
| 9,670,974 B2 | 6/2017 | Kawaguchi et al. |

(Continued)

FOREIGN PATENT DOCUMENTS

| | | |
|---|---|---|
| CN | 104670207 | 6/2015 |
| DE | 10305297 | 8/2004 |

(Continued)

*Primary Examiner* — Justin Holmes
(74) *Attorney, Agent, or Firm* — Rankin, Hill & Clark LLP (57) ABSTRACT

A launch control system launches a vehicle from a slowed speed or stopped condition, to an accelerated speed. The system is activated by operating a switch while the vehicle is stopped. An acceleration pedal is depressed while an up shifter paddle and down shifter paddle are being held in a shifting position. The system launches the vehicle when the up shifter paddle and the down shifter paddle are simultaneously moved to a non-shifting position. The system automatically switches gears during the launch so as to increase the speed of the vehicle. The system is activated until the speed of the vehicle reaches a speed associated with the amount the accelerated pedal is depressed. The system may further inhibit yaw rotation of the vehicle during launch by moderating a rotation rate of the vehicle engine.

20 Claims, 3 Drawing Sheets

(56) References Cited

U.S. PATENT DOCUMENTS

| | | |
|---|---|---|
| 9,688,277 B2 | 6/2017 | Furuya |
| 2010/0211254 A1* | 8/2010 | Kimura .................. F16H 59/02 |
| | | 701/31.4 |
| 2015/0266479 A1* | 9/2015 | Blakeway ........... B60W 50/082 |
| | | 477/92 |
| 2016/0356370 A1 | 12/2016 | Richards et al. |
| 2017/0080938 A1 | 3/2017 | Ohashi et al. |
| 2017/0151948 A1 | 6/2017 | Liu et al. |
| 2018/0244260 A1* | 8/2018 | Ruybal ................. B60W 20/19 |

FOREIGN PATENT DOCUMENTS

| | | |
|---|---|---|
| DE | 10305298 | 8/2004 |
| EP | 2302248 | 11/2013 |
| EP | 2949535 | 8/2016 |
| GB | 2323650 | 12/2000 |
| GB | 2509736 | 7/2014 |
| JP | 2015137593 | 7/2015 |

* cited by examiner

LAUNCH CONTROL

BACKGROUND

Wheeled vehicles typically accelerate due to an increase in the rate of rotation of the vehicle wheels, which causes a corresponding increase in a speed of the vehicle. The rate of rotation of the wheels is dependent on the rotation rate of the engine, which is selectively engaged to the wheels through a transmission.

The transmission may be controlled manually through the use of a clutch in a manual transmission, where user input to the clutch determines the level of engagement between the engine and the wheels. In such a situation, a clutch pedal and a separate acceleration pedal are often simultaneously operated by a user applying a separate foot on each pedal. A user may have to practice using the clutch in order to get fully acquainted with its operation and to efficiently operate the vehicle. Quick acceleration of the vehicle using a manual transmission requires a precise balance between the level of operation of the acceleration pedal (which determines the rotation rate of the vehicle engine) and the level of operation of the clutch pedal (which determines the amount of engagement between the engine and the wheels and the speed at which the engine is engaged with the wheels). In such a situation, the user has direct control of how fast the clutch is moved from the non-engaged position (i.e. engine is not engaged with the wheels) to a fully engaged position (i.e. engine is fully engaged with the wheels). Although the user can directly control the rate of acceleration in this system, operation of the vehicle requires the use of both feet, one on each of the clutch pedal and the acceleration pedal, and it requires a certain level of aptitude on the part of the user, which may not be possessed by all individuals. Further complicating this process is that gears in the transmission have to be changed manually by the user as the speed of the vehicle increases. Switching of gears is accomplished by moving a gear shifter by hand during operation of a clutch pedal, and gears have to be switched at precise times to properly accelerate the vehicle.

The transmission may also be controlled semi-manually in a clutch-less manual transmission, which is similar to a manual transmission except that the clutch is operated automatically by a computer controller in response to user input to the acceleration pedal and a gear shifter. In this situation, the user still has direct control over which gear is being utilized in the transmission, but has no direct control of how fast the clutch is moved from the non-engaged position to the engaged position. As such, the user does not fully directly control the rate of acceleration in this system. Further, although the user can partially control the rate of acceleration in this system, operation of the vehicle requires the gears to be manually changed at precise times during acceleration of the vehicle.

The transmission may also be controlled automatically through the use of a torque converter (i.e. motion isolator) in an automatic transmission, where user input to the acceleration pedal determines the amount of power transferred from the engine to the wheels. In this system, the engine and wheels are hydraulically coupled through the torque converter, and the gears are automatically selected by an automatic system. In such a situation, the user has no direct control of how the engine and wheels are engaged, and can only control the operation of the engine through the acceleration pedal.

BRIEF DESCRIPTION

According to one aspect, a launch control system of a vehicle includes a switch selectively operable to put the system in a launch control mode; an up shifter operatively connected to a transmission of the vehicle; a down shifter operatively connected to the transmission; and a throttle regulating a rotation rate of a engine of the vehicle. The system is put in the launch control mode only when the switch is operated while a speed of the vehicle is below a predetermined speed threshold. The system launches the vehicle when the system is in the launch control mode and the following steps a)-c) are carried out in order: a) the up shifter and the down shifter are simultaneously activated, b) the throttle is opened to increase the rotation rate of the engine, and c) the up shifter and the down shifter are simultaneously deactivated. The system launches the vehicle by causing the speed of the vehicle to increase.

According to another aspect, a vehicle includes a launch control system. The launch control system includes a switch selectively operable to put the system in a launch control mode; an up shifter operatively connected to a transmission of the vehicle; a down shifter operatively connected to the transmission; and a throttle regulating a rotation rate of a engine of the vehicle. The system is put in the launch control mode when the switch is operated while a speed of the vehicle is below a predetermined speed threshold. The system launches the vehicle when the system is in the launch control mode, and the following steps a)-c) are carried out in order: a) the up shifter and the down shifter are simultaneously activated, b) the throttle is opened to increase the rotation rate of the engine, and c) the up shifter and the down shifter are simultaneously deactivated. The system launches the vehicle by causing the speed of the vehicle to increase.

According to another aspect, method of launching a vehicle includes operating a switch when a vehicle speed is below a predetermined speed threshold to activate a launch control mode for the vehicle. An up shifter and a down shifter of the vehicle are simultaneously activated. A throttle of the vehicle is opened to increase a rotation rate of the engine to be greater than an idling rotation rate of the engine. The up shifter and the down shifter are then simultaneously deactivated. Launching the vehicle causes the vehicle speed to increase.

DETAILED DESCRIPTION

As used herein, "launch" or cognate terms refers to accelerating a vehicle from a first speed that is under a predetermined speed threshold, to a second speed that is greater than the first speed and that may be greater than the predetermined speed threshold.

Figure 1:
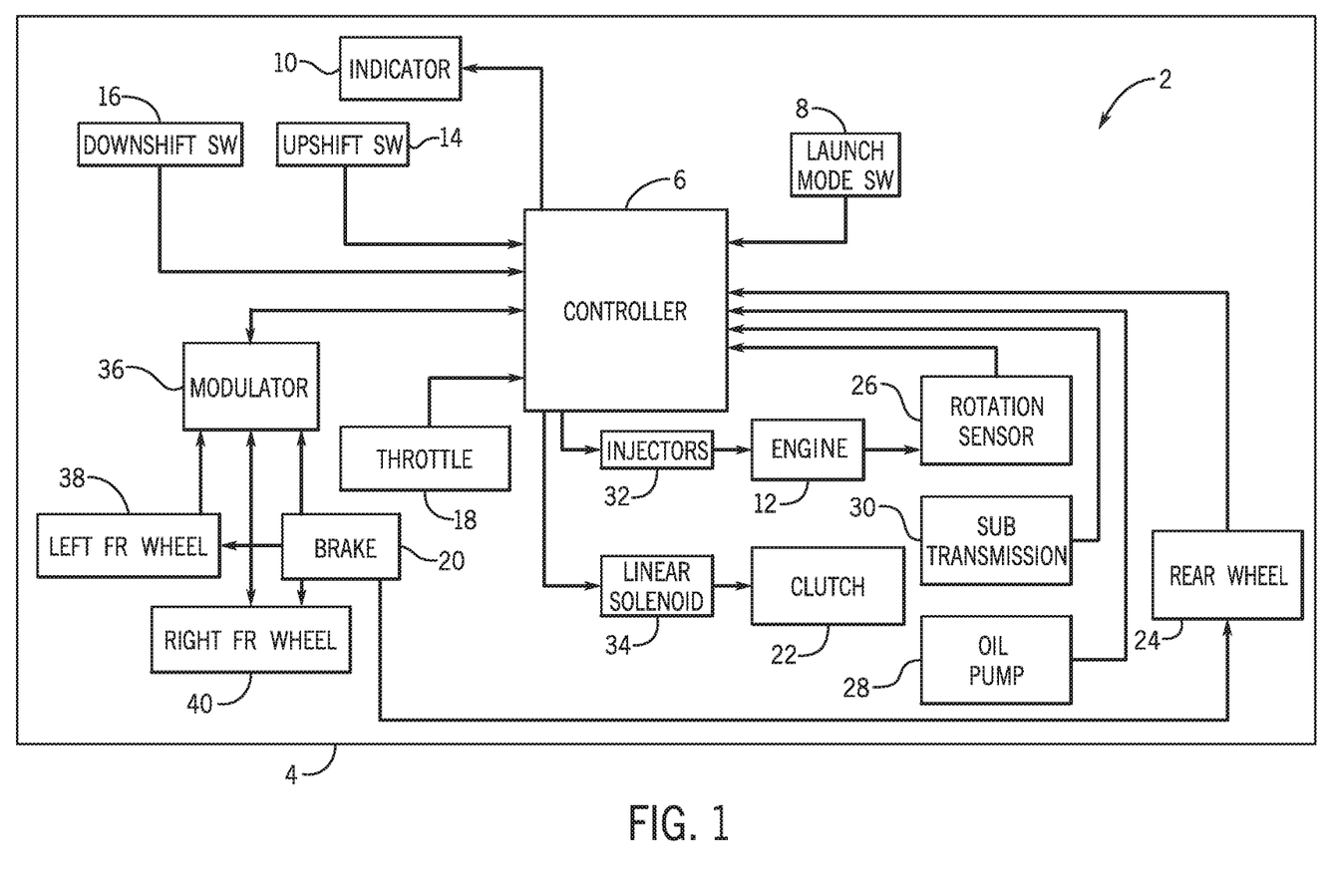
FIG. 1 is a schematic diagram of a launch control system according to the present subject matter.

Referring to the figures, a launch control system 2 may be included in a vehicle 4 and utilized for launching the vehicle 4. The launch control system 2 includes a controller 6, a switch 8, an indicator 10, and may include or utilize various components of the vehicle 4 such as a engine 12, an up shift button/paddle 14, a down shift button/paddle 16, a throttle 18, a brake 20, etc.

The vehicle 4 is not particularly limited by the present subject matter, and may include any of a variety of powered vehicles including, but not limited to an automobile, motorcycle, all-terrain vehicle (ATV), recreational vehicle (RV), train, scooter, or any type of wheeled vehicle having at least one wheel that is rotated by one or more engines 12 of the vehicle 4. The one or more engines 12, may include for example, a combustion engine. The vehicle 4 can have any of a variety of transmissions, including an automatic transmission or a clutch-less manual transmission. The system 2 and the related vehicle 4, functions, and methods will be described in relation to a front-wheel drive vehicle including a clutch-less manual transmission and a combustion engine as the engine 12. However, it will be understood that the system 2 can be incorporated into other types of vehicles, including those with an automatic transmission, and being rear-wheel drive.

The launch control system 2 includes a controller 6 that is in communication with the various other components of the system 2 as described herein. The controller 6 is operable to facilitate various operations of the system 2 and of the vehicle 4 in order to launch the vehicle 4. The controller 6 may include an electronic control unit (ECU) or other type of computer controller that is capable of performing the functions as described herein, and may operate according to a computer program or other instructions in order to launch the vehicle 4.

The launch control system 2 includes a switch 8 (also referred to herein as "launch control switch") that is selectively operable to activate the launch control system 2. When activated, the system 2 is put into a launch control mode. Before the system 2 is put in the launch control mode, the system 2, or some components thereof, may be in an off mode (i.e. be in a deactivated state), or may be in a mode that is not the launch control mode, e.g. a standby mode, which may correspond to the first stage of FIG. 2.

When the system 2 is activated to be in the launch control mode, the controller 6 can control certain functions of the system 2 and/or vehicle 4 in order to launch the vehicle 4, but only if certain conditions are met as described in more detail herein. If these certain conditions are not met, then operation of the switch 8 may not put the system 2 in the launch control mode. The switch 8 may also be selectively operable to deactivate the system 2 so that the system 2 is taken out of the launch control mode. When not activated (e.g. deactivated), the system 2 is not in the launch control mode and therefore does not launch the vehicle 4. The system 2 may be taken out of the launch control mode by other steps or conditions as described in more detail herein. When the system 2 is not in the launch control mode, the vehicle 4 may be controlled by the user under normal operating conditions. As used herein "normal operating conditions" is when the system 2 is not in the launch control mode and the vehicle 4 is operated without utilizing the system 2.

The switch 8 may include any type of mechanical or electronic switch, and can be operable for example by pressing, turning, flipping, touching, voice- or sound-activation, light- or dark-activation, proximity activation, or otherwise. The switch 8 may be operated to provide, or cut, electrical power to various components of the system 2, or may be used simply to provide one or more signals to the controller 6 so that the system 2 or components thereof can be activated, and optionally deactivated.

The system 2 may include an indicator 10 (also referred to as "launch control mode indicator") providing indication to the user that the system 2 is in the launch control mode, or not in the launch control mode. The indicator 10 is not particularly limited, and may provide a visual indication, an audible indication, a tactile indication, other sensory indications, or combinations thereof to a user to indicate if the system 2 is activated or not activated. The indicator 10 may include one or more of a light source, speaker, vibrating device, other devices that can provide a sensory indication that communicates information including whether or not the system 2 is activated. In a non-limiting embodiment, the indicator 10 includes a light source that emits light when the system 2 is in the launch control mode, and does not emit light or flashes when the system 2 is not in the launch control mode.

Figure 2:
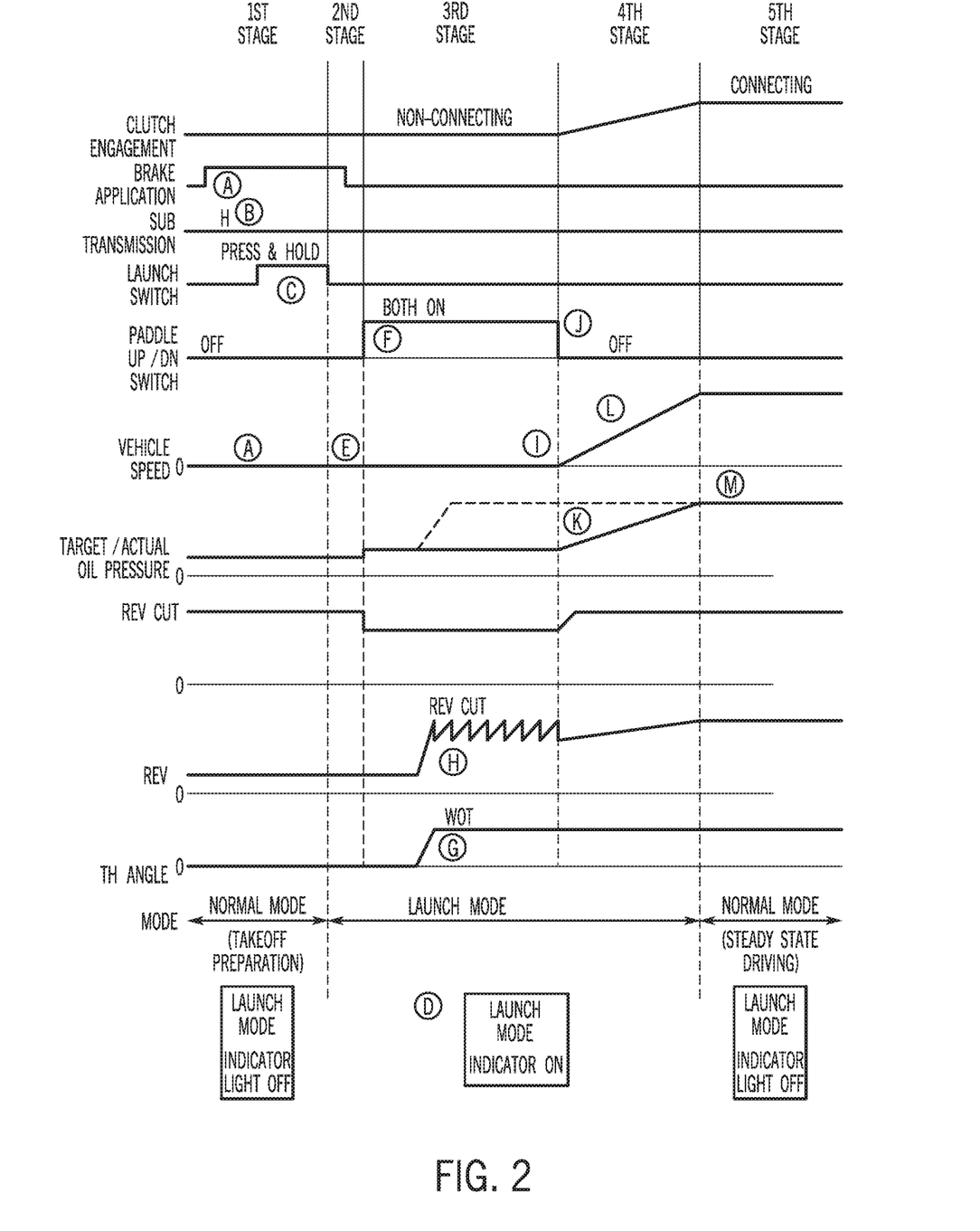
FIG. 2 is a schematic diagram showing operations of various vehicle and launch control system components before, during, and after activation of a launch control system.

In a non-limiting embodiment, the system 2 is activated only when the switch 8 is depressed and held in a depressed configuration for greater than a predetermined amount of time. The predetermined amount of time necessary to operate the switch 8 by depressing and holding the switch 8 may be for example, 1 second, 2 seconds, 3 seconds or more, or any other amount of time as desired (as indicated in FIG. 2 as "PRESS & HOLD"). When the switch 8 is released from the depressed configuration, this may define the beginning of the second stage as indicated in FIG. 2.

Activation of the system 2 may require more than just operation of the switch 8 as a first activation condition. In an exemplary embodiment, activation of the system 2 may further require satisfaction of other activation conditions in conjunction with operation of the switch 8 as the first activation condition.

A second activation condition may include a speed of the vehicle 4 being at or below a predetermined speed threshold. The predetermined speed threshold may be for example, 0 km/h, 2 km/h, 5 km/h, or values in between these or greater values as desired. In a non-limiting embodiment, the vehicle speed must be at or below the predetermined speed threshold for the entire predetermined amount of time that the switch 8 is operated. In an exemplary embodiment, the predetermined speed threshold is 1 km/h, such that the vehicle 4 must be moving at less than 1 km/h (or be stationary, i.e. moving at 0 km/h) in order for the system 2 to be put in the launch control mode.

When the vehicle 4 is moving at or below the predetermined speed threshold as shown in the first, second and third stages in FIG. 2, a clutch 22 of the vehicle 4 may be in a non-connecting position where the clutch 22 does not connect the engine 12 to the wheels of the vehicle 4, thus allowing rotation of the engine 12 independently from movement of the wheels.

The second activation condition may be satisfied by operation of a brake pedal of the vehicle 4. The second activation condition may be confirmed by data from a speed sensor (e.g. a speedometer) determining the rate of rotation of a non-drive wheel (e.g. rear wheels 24), or from a GPS, or other component. The second activation condition may be satisfied or confirmed if a rear wheel rate of rotation is less than a predetermine rear wheel rate of rotation threshold.

As used herein, "non-drive wheel" means a wheel of the vehicle 4 that is not and cannot be connected to the engine 12 through the transmission. In other words, in a front wheel drive vehicle, the back wheels are non-drive wheels. As used herein, "drive wheel" means a wheel of the vehicle 4 that can be selectively connected to the engine 12 through the transmission. In other words, in a front wheel drive vehicle, the front wheels are drive wheels.

A third activation condition may include a brake 20 being applied to a wheel of the vehicle 4 to inhibit or prevent rotation of the wheel. The wheel may be inhibited or prevented from rotating if a break pressure exerted by the brake 20 against the wheel is above a predetermined brake pressure threshold. In an exemplary embodiment, the brake 20 must be applied to the wheel of the vehicle 4 for the entire predetermined amount of time that the switch 8 is operated.

Application of the brake 20 to the wheel inhibits rotation of the wheel and thus inhibits or prevents movement of the vehicle 4. Like the second activation condition, the third activation condition may be satisfied operation of the brake pedal as shown in the first and second stage in FIG. 2, which causes the brake 20 to be applied to the wheel of the vehicle 4.

With respect to the second activation condition, operation of a brake pedal does not always ensure that the speed of the vehicle is below the predetermined speed threshold. This situation may occur where application of the brakes to the wheels is overcome by another force, such as when the vehicle 4 is traveling down-hill and thus being pulled by gravity, or is being moved by another vehicle such as a tow truck, for example. As such, satisfaction of the second activation condition along with the third activation condition may be required to put the system 2 in the launch control mode. However, the third activation condition may also be required to be satisfied in addition to the second activation condition, in order to confirm that the user intends to activate the system 2. In this regard, the vehicle 4 may not be moving even though the brake 20 is not being applied to the wheel of the vehicle 4. This situation may arise when the vehicle 4 is inhibiting from moving other than by application of the brake 20 to the wheel, such as if the vehicle 4 is traveling up-hill, or if the transmission of the vehicle 4 is in neutral, for example. As such, it may be important for the third activation condition to be satisfied in order to ensure the intent of the user to put the system 2 in the launch control mode.

The satisfaction of the third activation condition may be confirmed by a brake sensor that senses the brake 20 being applied to the wheel, a brake pedal sensor that senses the position of the brake pedal of the vehicle 4, a brake cylinder pressure sensor that senses the amount of pressure in a brake cylinder, or other device that can sense the brake 20 being applied to the wheel of the vehicle 4. Satisfaction of the third activation condition may also be confirmed or supplemented by a rotation rate of the engine 12 being at or near a minimum for operating the vehicle 4 (e.g. an idling rotation rate) as shown in the first, second and part of the third stages of FIG. 2 (indicated as "REV"). The rotation rate of the engine 12 may be based on information from a rotation sensor 26 sensing the rotation rate of the engine 12, a throttle angle sensor sensing the opening angle (indicated in FIG. 2 as "TH ANGLE") of the throttle 18, an acceleration pedal sensor that senses the position of the acceleration pedal of the vehicle 4, an oil pressure sensor that senses the actual oil pressure from an oil pump 28 exerted against the clutch 22, the vehicle speed measured by the speed sensor at the rear wheels 24, a clutch sensor sensing that the clutch 22 is not connecting the engine 12 with the wheels of the vehicle 4, or combinations thereof. In an automatic or semi-manual transmission, the clutch 22 may be automatically operated to disconnect the engine 12 from wheels.

If the vehicle 4 includes a two-speed sub-transmission 30 that can be shifted between a high speed stage (i.e. high gear set) and a low speed stage (i.e. low gear set), then a fourth activation condition may include the sub-transmission 30 of the vehicle 4 being in the high speed stage (i.e. the high gear set is engaged) as shown in FIG. 2 (indicated as "SUB TRANSMISSION" being "H"). This configuration for the sub-transmission 30 may inhibit the drive wheels on the vehicle 4 from slipping during launch. In an exemplary embodiment, the sub-transmission 30 must be in the high speed stage for the entire predetermined amount of time that the switch 8 is operated, and optionally for an entire launch sequence (as described herein) and for the entire launch of the vehicle 4. The sub-transmission 30 may be put in the high speed stage automatically by the controller 6, by manual operation of a sub-transmission switch, or otherwise. The fourth activation condition may be confirmed using a transmission sensor that senses the stage the sub-transmission 30 is in, or simply by operation of the sub-transmission switch.

These first, second, third and fourth activation conditions, and other activation conditions, may be satisfied and/or confirmed using the above-mentioned and various other components. These components, or associated sensors that sense their operation, may each be in communication with the controller 6 and may provide signals that are accessed by the controller 6 to confirm that the activation conditions are satisfied.

When the system 2 is in the launch control mode (which may correspond to the second, third, and fourth stages of FIG. 2), a certain launch sequence may be required to be performed in order to launch the vehicle 4. In an exemplary embodiment, the launch sequence includes a series of steps that have to be performed in order while the system 2 is in the launch control mode. If the steps of the launch sequence are not performed in order, then the system 2 may not launch the vehicle 4.

The launch sequence may include a first step of moving a gear shifter of the vehicle 4 from a non-shift position to a shift position and holding the gear shifter in the shift position. This may be performed to define the beginning of the third stage as indicated in FIG. 2. The non-shift position is where the gear shifter, while under normal operating conditions, would not cause a change in the gear being utilized in the transmission of the vehicle 4. The shift position is where the gear shifter, while under normal operating conditions, would change the gear being utilized in the transmission of the vehicle 4.

When the system 2 is in the launch control mode however (e.g. not under normal operating conditions), movement of the gear shifter from the non-shift position to the shift position may simply cause a signal to be sent to the controller 6 indicating that such movement of the gear shifter has been made, and does not cause a change in the gear being utilized in the transmission of the vehicle 4. In order for such a signal to be sent, a gear shifter sensor may be arranged in order to detect such movement of the gear shifter and may be in communication with the controller 6 to provide data of the sensed movement to the controller 6.

In an exemplary embodiment, the gear shifter includes an up shifter 14 and a separate and distinct down shifter 16. These may be arranged as buttons, or as paddles that are on opposite sides of a steering wheel of the vehicle 4.

When arranged as paddles on opposite sides of the steering wheel, the non-shift position for each of the up shift paddle 14 and the down shift paddle 16 may be spaced in front of the steering wheel; and the shift position for each of the up shift paddle 14 and the down shift paddle 16 may be closer to the steering wheel than the non-shift position. As such, the first step in the launch sequence may include the up shift paddle 14 and the down shift paddle 16 being moved from the non-shift position (spaced from the steering wheel)

to the shift position (closer to the steering wheel) by pulling them toward the steering wheel, and then holding them in the shift position.

When the up shift paddle 14 and the down shift paddle 16 are both in the shift position at the same time, they are considered simultaneously activated (indicated in FIG. 2 as "PADDLE UP/DN SWITCH" being "BOTH ON"). When the up shift paddle 14 and the down shift paddle 16 are both moved from the shift position to the non-shift position within a predetermined amount of time, they may be considered simultaneously deactivated. One or more sensors associated with each of the paddles 14, 16 may be used to confirm that both paddles 14, 16 are in the shift position (or the non-shift position) and thereby confirm that the first step has been performed.

The launch sequence may include a second step of increasing a rotation rate of the engine 12 (as indicated in FIG. 2 as "REV") while the up shift paddle 14 and the down shift paddle 16 are simultaneously activated, i.e. held in the shift position. This increase in rotation rate of the engine 12 may include increasing the rotation rate of the engine 12 from a first rotation rate to a second rotation rate greater than the first rotation rate. This increase may be accomplished by providing more fuel and air to the engine 12 for combustion. A user may cause this increase by pressing down on the acceleration pedal of the vehicle 4, which may cause the throttle of the engine 12 to open wider, cause an increased amount of fuel being delivered to the engine 12 through injectors 32, and thus cause an increase in the rotation rate of the engine 12. When the user presses down on the acceleration pedal to cause the increase in the rotation rate of the engine 12, the user may first release the brake pedal. Even though the brake pedal may be released to a non-braking position when the paddle shifters 14, 16 are held in the shift position, the system 2 maintains the brake pressure applied to the wheels in order to keep the vehicle 4 at or below the speed threshold. This may be accomplished by the controller 6 operating the brakes 20 independent of operation of the brake pedal, so as to maintain the brake pressure against the wheels and thereby keep the vehicle 4 below the predetermined speed threshold.

The first rotation rate of the engine 12 may be an idling rotation when the engine 12 is running and there is no input from the user to the acceleration pedal of the vehicle 4. The second rotation rate may be an accelerated rotation rate of the engine 12 that corresponds to the amount the acceleration pedal is depressed by the user.

If the acceleration pedal is fully depressed in the second step, which in normal operating conditions would cause the throttle to be in a wide open throttle position (as indicated in FIG. 2 as "WOT"), then the controller 6 may limit the rotation rate of the engine 12 to be below a predetermined rotation rate threshold, which may be 10,000 rotations per minute (rpm), 9000 rpm, 8000 rpm, 7000 rpm, or other rpm value. In a non-limiting embodiment, the predetermined rotation rate threshold for the engine 12 is 8000 rpm.

The rotation rate of the engine 12 may be limited by imposing a cut (indicated in FIG. 2 as "REV CUT") to the rotation rate. This cut to the engine may be a value of rpm, a percentage of rpm, or other limit. Limiting the rotation rate of the engine 12 may also be accomplished by limiting the throttle angle, using the injectors 32 to limit the amount of fuel being delivered to the engine 12, or by other methods such as an engine brake. Limiting the rotation rate of the engine 12 is depicted in FIG. 2 by the "REV CUT" line going down in the second stage of the launch mode. The limited rotation rate of the engine 12 is depicted in FIG. 2 by the up and down peaking of the "REV" line in the second stage of the launch mode.

The rotation rate of the engine 12 may be determined in one or more ways, including but not limited to by using the rotation rate of the engine 12 as sensed by a engine sensor, which is in communication with the controller 6 to provide a signal to the controller 6 communicating the sensed rotation rate of the engine 12.

The performance of the second step of the launch sequence may be confirmed or supplemented by a throttle angle, i.e. the opening angle of the throttle 18. The throttle angle may be sensed by a throttle sensor, which sends a signal to the controller 6 communicating the sensed throttle angle. The system 2, may launch the vehicle 4 only if an opening angle of the throttle 18 is greater than a predetermined opening angle threshold. This opening angle threshold may be an opening angle of the throttle 18 that is greater by a certain number or degrees than the angle of the throttle 18 when the engine 12 is idling.

The launch sequence may include a third step moving the gear shifter of the vehicle 4 from the shift position to the non-shift position while the engine 12 is being rotated faster than the first rotation rate, e.g. at the second rotation rate. Such movement of the gear shifter from the shift position may be accomplished by simply releasing the gear shifter, which may be biased to the non-shift position by a spring or other biasing element.

When the gear shifter includes the up shift and down shift paddles 14, 16, the third step includes simultaneously deactivating the paddles 14, 16. The paddles 14, 16 may be biased to the non-shift position, which is spaced from the steering wheel. A user holding the paddles 14, 16 during the second step in the shift position, which is closer to the steering wheel than the non-shift position, may simply release the paddles 14, 16 in the third step so that the paddles 14, 16 return by operation of the spring or other biasing element to the non-shift position. As with the first step, movement of the paddles 14, 16 to the non-shift position may be confirmed by one or more sensors associated with the paddles 14, 16. The third step may be performed to define the beginning of the fourth stage as indicated in FIG. 2.

The steps of the launch sequence may be required to be performed while one or more of the activation conditions are being satisfied. If the one or more activation conditions fails to be satisfied while the launch sequence is being performed, then the system 2 may be taken out of the launch control mode. For example, the system 2 may be taken out of the launch control mode if, when in the launch control mode and before the vehicle 4 is launched, the vehicle speed ever exceeds the predetermined speed threshold; or if the switch 8 is pressed a second time; or if only one of the paddles 14, 16 is moved to the non-shift position (e.g. the paddles 14, 16 are moved to the non-shift position at different times that are separated by more than a predetermined amount of time); or if the paddles 14, 16 are kept in the shift position for greater than predetermined amount of time.

Furthermore, the steps of the launch sequence may be required to be performed while various launch conditions are satisfied, including for example, proper operation of the engine 12, proper operation of a vehicle stability assist system, proper operation of the transmission, a seatbelt being fastened, an oil temperature being above a threshold value, a water temperature being above a threshold value, no shifting of the transmission taking place, etc.

Performance of the launch sequence steps in order from the first step, to the second step, to the third step may result in the system 2 launching the vehicle 4. Movement (e.g. release) of the paddles 14, 16 to the non-shift position in the third step may cause the brake 20 to be not applied to the wheels so that the wheels are not inhibited by the brake 20 from rotating. Additionally, release of the paddles 14, 16 may cause the clutch 22 to move from the non-connecting position to a connecting position (indicated in FIG. 2 as "CLUTCH ENGAGEMENT"), where the clutch 22 connects the engine 12 to the wheels of the vehicle 4, thus allowing the engine 12 to rotate the wheels.

Movement of the clutch 22 from the non-connecting position to the connecting position is controlled by the controller 6 activating a linear solenoid 34 to increase the actual oil pressure exerted against the clutch 22. This increase in the actual oil pressure exerted against the clutch 22 causes the clutch 22 toward the connecting position. The actual oil pressure (solid line, FIG. 1) exerted against the clutch 22 may increase from an initial oil pressure, which does not cause the clutch 22 to move to the connecting position and allows the clutch 22 to stay in the non-connecting position, toward a target oil pressure (dotted line, FIG. 1), which causes the clutch 22 to be in the connecting position. However, the actual oil pressure may not match the target oil pressure because the actual oil pressure may be restricted to the initial oil pressure until the vehicle is launched. Only after the paddles 14, 16 are released, will the actual oil pressure increase toward the target oil pressure to launch the vehicle 4.

The speed at which the clutch 22 is moved from the non-connecting position to the connecting position is controlled by the controller 6. This speed may be dependent on a number of factors, including for example, the throttle angle. In other words, as the acceleration pedal is depressed to a greater degree, the speed at which the clutch 22 is moved from the non-connecting position to the connecting position may increase.

During the launch of the vehicle 4, the controller 6 controls the gear selection in the transmission of the vehicle 4. This in in contrast to normal operating conditions, where movement of the paddles 14, 16 cause a change in the gears being used in the transmission. The controller 6 may limit the amount of time the transmission is in first gear (i.e. the lowest gear, which produces the most torque) so as to inhibit wheel slip while the speed of the vehicle 4 increases. In other words, the controller 6 may cause the transmission to change from the first gear to a higher gear more quickly than under normal operating conditions so that the high rotation rate of the engine and the quick engagement of the clutch results in acceleration of the vehicle 4 rather than spinning the drive wheels.

In certain situations when one drive wheel, e.g. the front left wheel 38, is on a different type of surface than the other drive wheel, e.g. the front right wheel 40, the vehicle 4 may experience yaw rotation during the launch. This yaw rotation may result from the different surfaces providing a varying amount of traction for the two wheels 38, 40, causing the vehicle 4 to pull to one side or the other during launch. The varying amount of traction may cause the two wheels 38, 40 to rotate at different rates during launch. If for example, the front right wheel 40 is on dry pavement and the front left wheel 38 is on ice or mud, then front left wheel 38 may spin on the ice without propelling the vehicle 4 forward, while the front right wheel 40 may grip the pavement and propel the vehicle 4 forward. In this scenario, the front left wheel 38 may be under less load than the front right wheel 40, and may therefore rotate at a fast rate that the front right wheel 40. This may cause the vehicle 4 to experience yaw rotation to the left.

The rate of rotation for each of the wheels 38, 40, and the difference between such rates of rotation, may be monitored by the controller 6 or by a modulator 36, which may include a vehicle stability assist (VSA) modulator, in communication with the controller 6. When a difference between the rate of rotation of the front left wheel 38 and a rate of rotation of the front right wheel 40 is above a predetermined rate of rotation difference threshold, then the controller 6 or the modulator 36 may be put into, or activate, a yaw control mode for the system 2, to thereby inhibit yaw rotation of the vehicle 4 by causing the rotation rate of the engine 12 to be reduced. This reduction in the rotation rate of the engine 12 may reduce the difference between the rate of rotation of the front left wheel 38 and a rate of rotation of the front right wheel 40, thus inhibiting yaw rotation of the vehicle 4. Reduction in the rotation rate of the engine 12 may continue until the difference between the rate of rotation of the front right wheel 40 and the rate of rotation of the front left wheel 38 is less than the predetermined rate of rotation difference threshold. The rotation rate of the engine 12 may be reduced in this process in an incremental fashion, linearly, or for a predetermined amount and for a predetermined amount of time. The yaw rotation of the vehicle 4 may be inhibited in other ways, including by locking the rotation of the slipping wheel (e.g. the front left wheel 38) to the rotation of the gripping wheel (e.g. the front right wheel 40), by applying a brake to the slipping wheel to slow its rate of rotation, or by other measures.

When the clutch is fully moved to the connecting position, the system 2 may be taken out of the launch control mode, which results in a return to normal operation conditions. This may be determined by the actual oil pressure matching the target oil pressure, which may define the beginning of the fifth stage of the launch mode as depicted in FIG. 2. The actual oil pressure may match the target oil pressure when the speed of the vehicle 4 corresponds to the amount the acceleration pedal is depressed. The launch control system 2 may be deactivated at this point, and control of the vehicle 4 may revert back to normal operating conditions.

An overview of the system 2 as described herein, is provided below in Table 1. In Table 1, the reference letter indicates the corresponding component, function, or condition as depicted in the diagram of FIG. 2.

TABLE 1

SYSTEM OVERVIEW

| State of System | Reference | Component, Function, Condition | Purpose |
|---|---|---|---|
| Not Activated | A | Brake pressure Rear wheel rotations | To determine vehicle is stopped. Rear wheel speed may be used in determining the clutch is in a free state. |

TABLE 1-continued

SYSTEM OVERVIEW

| State of System | Reference | Component, Function, Condition | Purpose |
|---|---|---|---|
| | B | Sub-transmission position | To determine vehicle is in high speed stage |
| | C | Launch switch | To activate Launch Control Mode |
| Activated | D | Launch Indicator | To inform driver Launch Control Mode is activated |
| | E | Rear wheel rotations | To determine the clutch is in a free state |
| | F | Up shift switch Down shift switch | Hold as part of launch sequence |
| | G | Acceleration pedal position | To determine the throttle position |
| | H | Injectors | To hold engine at high rpm through fuel cut |
| | | Crank rotation | To determine engine rotation rate |
| | I | Rear wheel rotations | To determine vehicle is not moving in excess of threshold |
| | J | Up shift switch Down shift switch | Release to launch vehicle |
| | K | Linear solenoid | To engage clutch |
| | L | Front left wheel rotations Front right wheel rotations | To inhibit Yaw during launch |
| Not Activated | M | Linear solenoid | To determine that oil pressure on clutch matches the normal wide open throttle launchcommand oil pressure |

Figure 3:
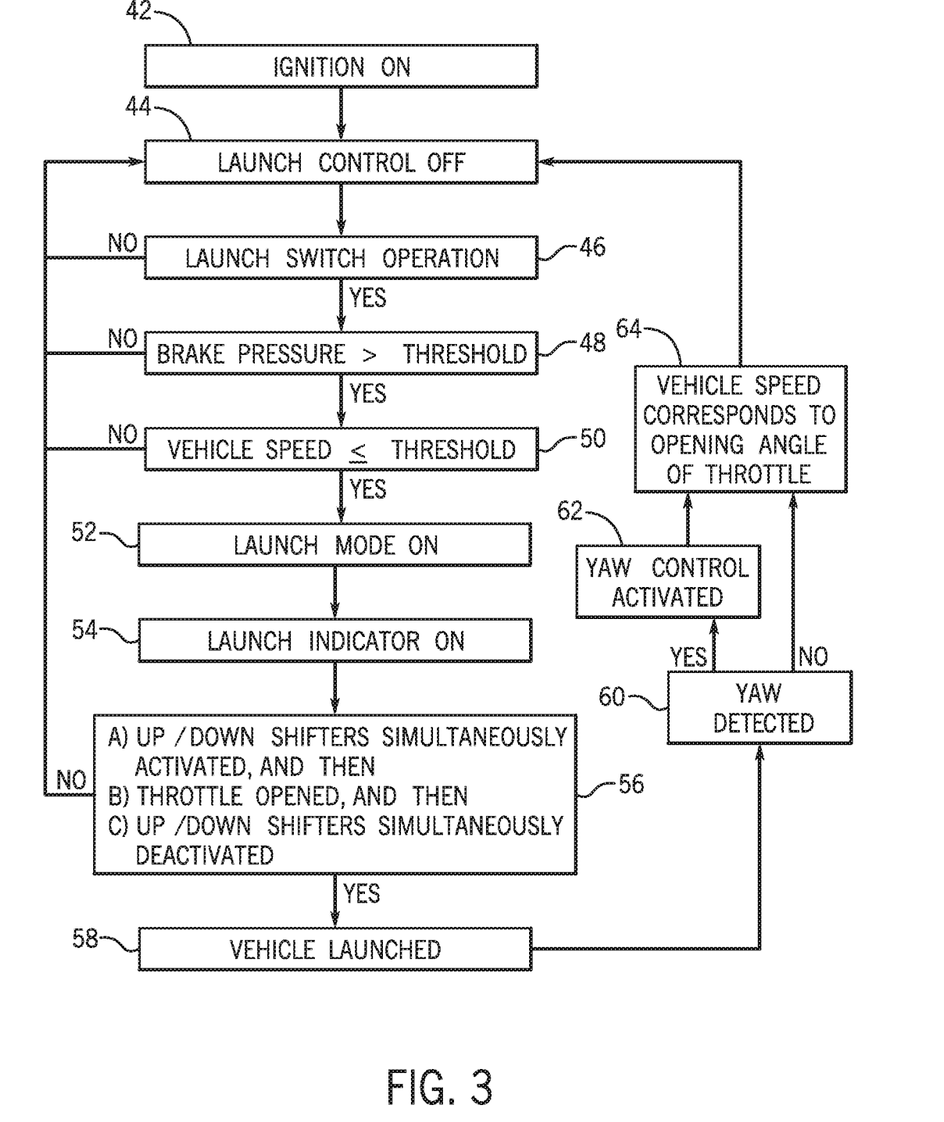
FIG. 3 is a method of launching a vehicle according to the present subject matter.

With reference to FIG. 3, a method of launching a vehicle includes at 42, determining if an ignition of the vehicle 4 is turned on in order to operate the vehicle 4. Activation of the ignition may cause activation of the engine 12 and other components of the vehicle 4 for operation of the vehicle 4 under normal operating conditions, which may correspond to the first stage depicted in FIG. 2. After the ignition is turned on, the launch control system 2 is off (e.g. not in the launch control mode) at 44, and the vehicle 4 is being operated under normal operating conditions.

The method includes at 46, operating the launch control switch 8 in order to activate the launch control system 2 to be in the launch control mode. If the switch 8 is not operated at 46, then the launch control system 2 is in the deactivated state at 44. If the switch 8 is operated at 46, then the method includes at 48, ensuring that the brake pressure associated with operation of the brake is above the predetermined brake pressure threshold. If the brake pressure is not above the predetermined brake pressure threshold, then the system 2 may be in the deactivated state at 44. If the brake pressure is above the predetermined brake pressure threshold at 44, then the method includes at 50, ensuring that the vehicle speed is at or below the predetermined speed threshold. If the vehicle speed is not at or below the predetermined speed threshold, then the system 2 may be in the deactivated state at 44. If vehicle speed is at or below the predetermined speed threshold at 50, then the method includes at 52, putting the system into the launch control mode. This may correspond to the second through fourth stages depicted in FIG. 2. The launch control mode indicator 10 may be turned on or otherwise operated at 54, to provide an indication that the system 2 is in the launch control mode. At 56, the method includes ensuring that the launch sequence is performed; including ensuring that a) the up and down shifters 14, 16 are simultaneous activated, b) the opening angle of the throttle 18 is greater than the predetermined opening angle threshold, and c) the up and down shifters 14, 16 are simultaneous deactivated. If the launch sequence is not performed at 56, then the vehicle 4 is not launched. If the launch sequence is not performed within a predetermined time period, the system 2 may be deactivated after the predetermined time period has elapsed. If the launch sequence is performed at 56, then the vehicle 4 is launched at 58.

After the vehicle 4 is launched at 58, the method includes at 60, detecting if there is yaw rotation in the vehicle 4 during launch that is above a threshold—as measured to be the difference in the rates of rotation of the front left and right wheels 38, 40 being above the predetermined rate of rotation difference threshold. If there is yaw rotation detected that is above the threshold, then the method includes at 62, activating a yaw control mode for the system 2 to reduce the yaw rotation so that it is below the threshold—as measured by the difference in the rates of rotation of the front left and right wheels 38, 40 being below the predetermined rate of rotation difference threshold.

If there is no yaw detected that is above the threshold at 60, or if the yaw rotation is reduced to be below the threshold at 62, the method then includes at 64, determining if the vehicle speed corresponds to the opening angle of the throttle 18. This may be determined when the actual oil pressure exerted against the clutch 22 matches the target oil pressure, which target oil pressure may be the oil pressure that would be present during normal operating conditions when the throttle is wide open.

Once the vehicle speed corresponds to the opening angle of the throttle 18, the launch control system may be deactivated at 44, and the vehicle 4 may be controlled under normal operating conditions.

Another method of launching a vehicle includes operating the switch 8 when the vehicle speed is below the predetermined speed threshold, which activates the system 2 to be in the launch control mode.

When the vehicle speed is below the predetermined speed threshold and when the system 2 is in the launch control mode, the up shifter 14 and the down shifter 16 of the vehicle 4 are then simultaneously activated.

When the up shifter 14 and the down shifter 16 are simultaneously activated, when the vehicle speed is below the predetermined speed threshold, and when the system 2 is in the launch control mode, the throttle 18 of the vehicle 4 is then opened to increase a rotation rate of the engine 12 to be greater than the idling rotation rate of the engine 12.

When the throttle 18 of the vehicle 4 is then opened to increase a rotation rate of the engine 12 to be greater than the idling rotation rate of the engine 12, when the up shifter 14 and the down shifter 16 are simultaneously activated, when the vehicle speed is below the predetermined speed threshold, and when the system 2 is in the launch control mode, then the up shifter 14 and the down shifter 16 are simultaneously deactivated in order to launch the vehicle 4, which causes the vehicle speed to increase.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A launch control system of a vehicle, comprising:
    a switch selectively operable to put the system in a launch control mode;
    an up shifter operatively connected to a transmission of the vehicle;
    a down shifter operatively connected to the transmission; and
    a throttle regulating a rotation rate of a engine of the vehicle;
    wherein:
    the system is put in the launch control mode only when the switch is operated while a speed of the vehicle is below a predetermined speed threshold;
    the system launches the vehicle when the system is in the launch control mode and the following steps a)-c) are carried out in order,
        a) the up shifter and the down shifter are simultaneously activated,
        b) the throttle is opened to increase the rotation rate of the engine, and
        c) the up shifter and the down shifter are simultaneously deactivated; and
    the system launches the vehicle by causing the speed of the vehicle to increase.

2. The system of claim 1, further comprising an indicator operable to provide an indication that the system is in the launch control mode.

3. The system of claim 1, wherein:
    the system further comprises a brake selectively operable to inhibit movement of the vehicle; and
    the system is not put into the launch control mode unless the brake and the switch are simultaneously operated.

4. The system of claim 3, wherein:
    the system further comprises a clutch selectively operable to operatively connect and disconnect the transmission and the engine;
    operation of the brake causes the clutch to operatively disconnect the transmission from the engine; and
    launching the vehicle includes causing the clutch to operatively connect the transmission to the engine.

5. The system of claim 4, wherein the system is not put into the launch control mode unless:
    a brake pressure associated with operation of the brake is more than a predetermined brake pressure threshold;
    the clutch operatively disconnects the engine from the transmission; and
    a rear wheel rate of rotation is less than a predetermine rear wheel rate of rotation threshold.

6. The system of claim 3, wherein:
    the transmission includes a high speed stage and a low speed stage; and
    the system is not put into the launch control mode unless the transmission is in the high speed stage.

7. The system of claim 1, wherein the system launches the vehicle only if an opening angle of the throttle is greater than a predetermined opening angle threshold.

8. The system of claim 7, wherein after launching the vehicle, the system is taken out of the launch control mode when the speed of the vehicle after being launched corresponds to the opening angle of the throttle.

9. The system of claim 1, wherein after being put in the launch control mode and before launching the vehicle, the system is taken out of the launch control mode if the speed of the vehicle rises above the predetermined speed threshold.

10. The system of claim 1, wherein when a difference between a rate of rotation of a front right wheel and a rate of rotation of a front left wheel is greater than a predetermined rate of rotation difference threshold, then the rotation rate of the engine is reduced until the difference between the rate of rotation of the front right wheel and the rate of rotation of the front left wheel is less than the predetermined rate of rotation difference threshold.

11. A vehicle including a launch control system, the launch control system comprising:
    a switch selectively operable to put the system in a launch control mode;
    an up shifter operatively connected to a transmission of the vehicle;
    a down shifter operatively connected to the transmission; and
    a throttle regulating a rotation rate of a engine of the vehicle;
    wherein:
    the system is put in the launch control mode when the switch is operated while a speed of the vehicle is below a predetermined speed threshold;
    the system launches the vehicle when the system is in the launch control mode, and the following steps a)-c) are carried out in order,
        a) the up shifter and the down shifter are simultaneously activated,
        b) the throttle is opened to increase the rotation rate of the engine, and
        c) the up shifter and the down shifter are simultaneously deactivated; and
    the system launches the vehicle by causing the speed of the vehicle to increase.

12. A method of launching a vehicle comprising:
    operating a switch when a vehicle speed is below a predetermined speed threshold to activate a launch control mode for the vehicle;
    simultaneously activating an up shifter and a down shifter of the vehicle;
    opening a throttle of the vehicle to increase a rotation rate of a engine of the vehicle to be greater than an idling rotation rate of the engine; and
    simultaneously deactivating the up shifter and the down shifter;
    wherein launching the vehicle causes the vehicle speed to increase.

13. The method of claim 12, wherein the vehicle includes an indicator indicating that the launch control mode has been activated.

14. The method of claim 12, wherein the launch control mode is activated when the switch is pressed and held for a predetermined amount of time.

15. The method of claim 12, wherein launch control mode is activated only if the vehicle is stopped.

16. The method of claim 15, wherein the vehicle is stopped by operating a brake pedal of the vehicle.

17. The method of claim 12, wherein the up shifter and the down shifter are paddles activated by holding the paddles in a shift position.

18. The method of claim 12, wherein the throttle is opened by operating an acceleration pedal of the vehicle.

19. The method of claim 12, wherein:
- the vehicle speed is increased until the vehicle speed corresponds with an opening angle of the throttle; and
- the launch control mode is deactivated when the vehicle speed corresponds with the opening angle of the throttle.

20. The method of claim 12, further including:
- determining a difference between a rate of rotation of a front right wheel and a rate of rotation of a front left wheel; and
- when a difference between a rate of rotation of the front right wheel and a rate of rotation of the front left wheel is greater than a predetermined rate of rotation difference threshold, reducing the rate of rotation of the engine until the difference between the rate of rotation of the front right wheel and the rate of rotation of the front left wheel is less than the predetermined rate of rotation difference threshold.

* * * * *